United States Patent [19]
Spercel

[11] 3,814,299

[45] June 4, 1974

[54] ROD STOCK FEED MEANS

[76] Inventor: Robert Jack Spercel, c/o Sperco Inc. 7810 Lake Ave., Cleveland, Ohio 44102

[22] Filed: June 14, 1972

[21] Appl. No.: 262,544

[52] U.S. Cl.............................. 226/162, 226/149
[51] Int. Cl.............................................. B23q 5/22
[58] Field of Search .......... 226/162, 165, 166, 147, 226/149, 163, 164, 150; 214/1.1–1.4, 1.5

[56] References Cited
UNITED STATES PATENTS
| | | | |
|---|---|---|---|
| 332,889 | 12/1885 | Gerry | 226/147 |
| 2,730,230 | 1/1956 | Gordon | 226/149 |
| 2,750,025 | 6/1956 | Nichta | 226/165 |

Primary Examiner—Frank E. Werner
Attorney, Agent, or Firm—McNenny, Farrington, Pearne & Gordon

[57] ABSTRACT

An improved bar stock feed mechanism includes a gripper assembly which is operable between a closed condition in which gripping surfaces clampingly engage the bar stock and an open condition in which the gripping surfaces are spaced from the bar stock. Prior to the initiation of a bar feed operation, the gripper assembly is closed to securely grip the bar stock. A spindle chuck is then opened and the gripper assembly is moved toward the chuck through a feed stroke. Upon completion of the feed stroke, the chuck is closed. The gripper assembly is then opened and moved away from the chuck through a return stroke. If the gripper assembly is closed without a piece of bar stock in the gripper assembly, a detector is actuated to provide a control signal which effects an interruption in bar feed operations.

6 Claims, 8 Drawing Figures

DEGREES OF CAM ROTATION

ROD STOCK FEED MEANS

BACKGROUND OF THE INVENTION

This invention relates to a bar stock feed mechanism having a gripper which is operable between open and closed conditions.

Many known machine tools, such as automatic screw machines of either the single or multiple spindle type, include a bar feed mechanism which moves incremental lengths of bar stock through a spindle chuck to a work area on successive cycles of operation. A well known bar feed mechanism includes a gripper having resilient feed fingers which are continouously urged into frictional engagement with the bar stock. When an incremental length of bar stock is to be fed to the work area, a turret mounted stop surface (or a swing stop) is positioned at a predetermined distance from the spindle chuck. The chuck is then opened and the gripper and bar stock are moved forwardly. During this forward stroke, a leading end of the bar stock hits against the stop surface and thereafter the gripper fingers frictionally slide forwardly along the bar stock. When the gripper reaches the end of its forward stroke, the spindle chuck is closed and the gripper fingers frictionally slide rearwardly along the bar stock during a return stroke. Bar stock feeder assemblies of this type are shown in U.S. Pat. No. 2,146,583 and in a text entitled "Construction and Use of Automatic Screw Machines" published in 1967 by Brown and Sharpe Mfg. Co. of Precision Park, North Kingston, R.I.

The use of the stop surface to interrupt forward motion of the bar stock with these known bar feed assemblies results in one of the mounting locations on the turret being utilized to hold a stop member which must be maintained in position as the bar stock is being fed. Therefore, the number of turret mounting locations available for tools is reduced and a tool on the turret cannot be positioned for a machining operation while the bar stock is being fed. When the forward motion of the bar stock is interrupted by hitting against the stop surface, there is a tendency for the bar stock to bounce back with a resulting inaccuracy of feed. There is also a tendency for shock and wear on the feed mechanism. In addition, thin sectioned or pointed parts may be damaged when they hit against the stop surface. Since the gripper fingers are urged into continuous frictional engagement with the bar stock, linear streaks may be formed by dragging of the feed fingers along the bar stock during overtravel (intended) on the gripper feed stroke or during the gripper return stroke.

Bar stock has also been fed to a work area with a selectively actuatable gripper which is mounted on the turret of a machine tool. The gripper is operated from an open condition to a closed condition to engage a leading end portion of the bar stock. The gripper and turret are then moved away from a spindle to pull an incremental length of bar stock into the work area. Such a bar feed mechanism is shown in U.S. Pat. No. 489,935. Wooden bar stock has been fed by piercing the bar stock with a feed finger during a forward stroke and moving the feed finger out of piercing engagement with the bar stock during a return stroke in the manner disclosed in U.S. Pat. No. 1,198,797.

SUMMARY OF THE PRESENT INVENTION

The present invention provides a bar stock feed mechanism having a gripper assembly which is operable between a closed condition in which gripping surfaces clampingly engage the bar stock and an open condition in which the gripping surfaces are spaced from the bar stock. Prior to the initiation of a feed stroke, the gripper assembly is closed while it is in a retracted position. A main or spindle chuck is then opened and the gripper assembly is moved forwardly to feed a desired length of bar stock into the work area. At the end of this forward movement of the gripper assembly, the spindle chuck is closed. The gripper assembly is then opened so that the gripper surfaces are spaced from the bar stock. The open gripper assembly is then moved through a return stroke in a direction away from the now closed spindle chuck. Accurate movement of the gripper assembly through a feed stroke of a predetermined length is promoted by urging a follower against a cam surface which controls the extent of movement of the gripper assembly.

After the bar feed mechanism has been operated through a number of cycles, it is contemplated that the remnant portion of the bar stock may be of a length which is less than the length to be fed on the next feed stroke. When this occurs, bar feed operations are advantageously interrupted until the remnant portion of bar stock has been removed from the spindle and a next succeeding piece of bar stock loaded in the bar feed mechanism. Accordingly, a detector assembly is operated in response to a closing of the gripper assembly without a piece of bar stock in the gripper assembly. When the detector assembly is operated, a signal is provided to initiate a control function.

Accordingly, it is an object of this invention to provide a new and improved apparatus for accurately feeding predetermined lengths of bar stock without hitting a leading end portion of the bar stock against a stop member or frictionally sliding a gripper along the bar stock.

Another object of this invention is to provide a new and improved apparatus for feeding bar stock which is to be moved to a work area and includes a gripper assembly which is operable between a closed condition in which the gripper assembly clampingly engages the bar stock and an open condition in which the gripper assembly is ineffective to grip the bar stock, an actuator for effecting operation of the gripper assembly between the open and closed conditions, and a mechanism for moving the gripper assembly through a feed stroke in a direction toward the work area with the gripper assembly in the closed condition and for moving the gripper assembly through a return stroke in a direction away from the work area with the gripper assembly in the open condition.

Another object of this invention is to provide a new and improved apparatus for feeding bar stock including a gripper assembly which is operable between open and closed conditions and a detector device for detecting when the gripper assembly is operated from the open condition to the closed condition without a piece of bar stock in the gripper assembly.

Another object of this invention is to provide a new and improved apparatus which includes a spindle having a chuck which is closed during a machining operation and a feed mechanism for feeding bar stock through the open chuck during a bar feed operation, and wherein the feed mechanism includes a gripper assembly which is operable between a closed condition in which it securely grips the bar stock and an open condition in which the gripper assembly is ineffective to grip the bar stock and a mechanism for moving the gripper assembly through a feed stroke toward a work area with the gripper assembly in its closed condition and the chuck in its open condition and for moving the gripper assembly through a return stroke away from the work area with the gripper assembly in its open condition and the chuck in its closed condition.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC EMBODIMENT OF THE INVENTION

Figure 1:
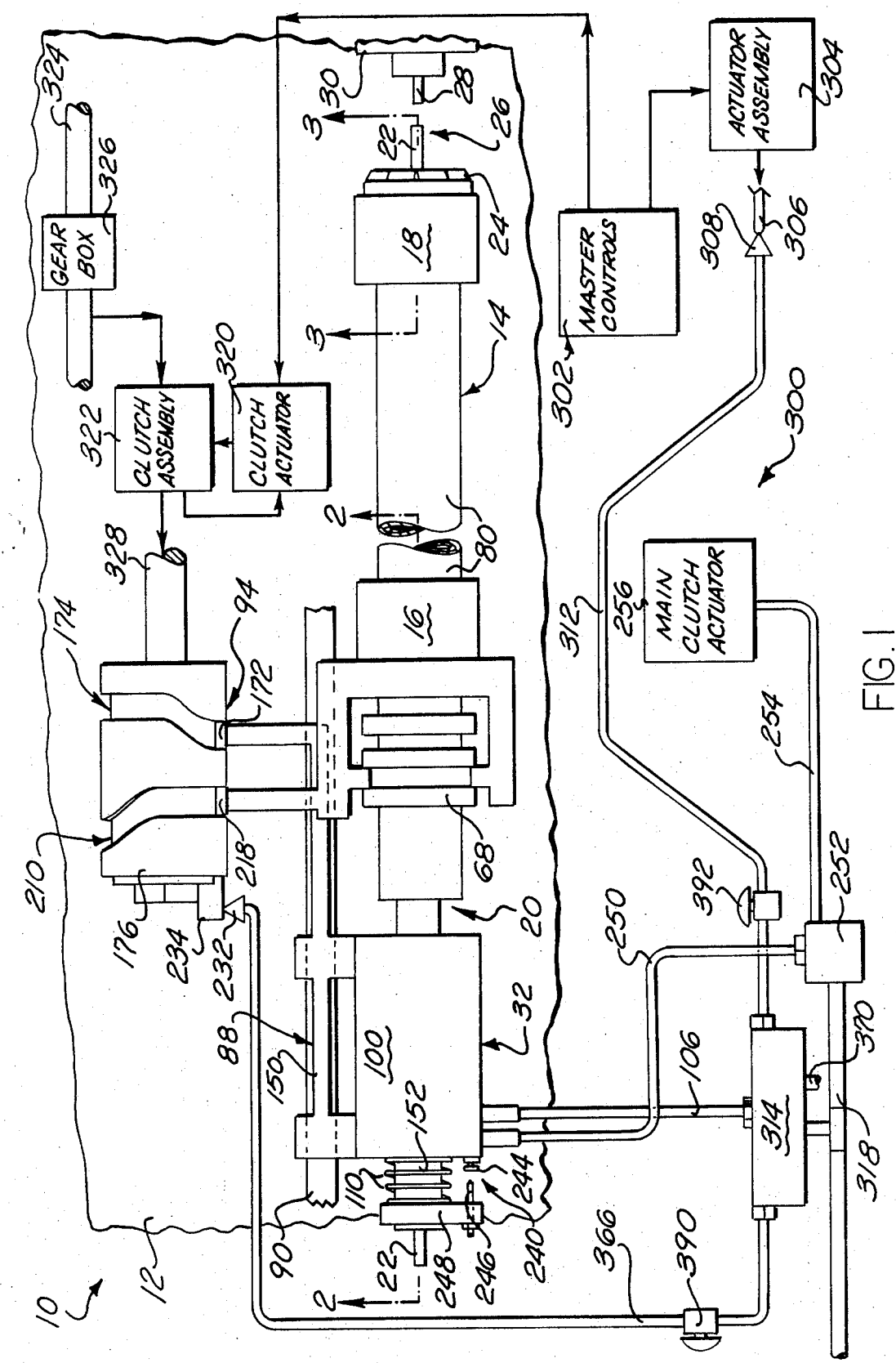
FIG. 1 is a schematic illustration of a machine tool having a bar stock feed mechanism constructed in accordance with the present invention.

A machine tool 10, illustrated schematically in FIG. 1, includes a base 12 on which a known spindle 14 is rotatably mounted by suitable bearings 16 and 18. A bar stock feed mechanism 20 constructed in accordance with the present invention is operable through feed and return strokes to feed incremental lengths of a piece of bar stock 22 through a spindle chuck 24 to a work area 26 where machining operations are performed on the leading end portion of the bar stock by tools 28 mounted on a movable turret 30. The bar stock feed mechanism 20 includes an actuator assembly 32 (FIG. 2) for operating a bar feed gripper assembly 36 between the open condition of FIG. 3 and the closed condition of FIG. 6. When the gripper assembly 36 is in the open condition of FIG. 3, gripping surfaces 40 on collet fingers 42 define a relatively large circular opening 44 and are spaced from the cylindrical outer surface of the bar stock 22 (see FIG. 4).

During operation of the machine tool 10, the spindle 14 rotates the bar stock 22 in the work area 26 while tools 28 on the turret 30 work on the bar stock. At the end of a machining operation, a suitable cross slide (not shown) is actuated to cut off the leading end portion of the bar stock 22 immediately adjacent to the chuck 24. The bar stock feed mechanism 20 is then activated to feed a predetermined length of the bar stock 22 into the work area 26.

Figure 2:
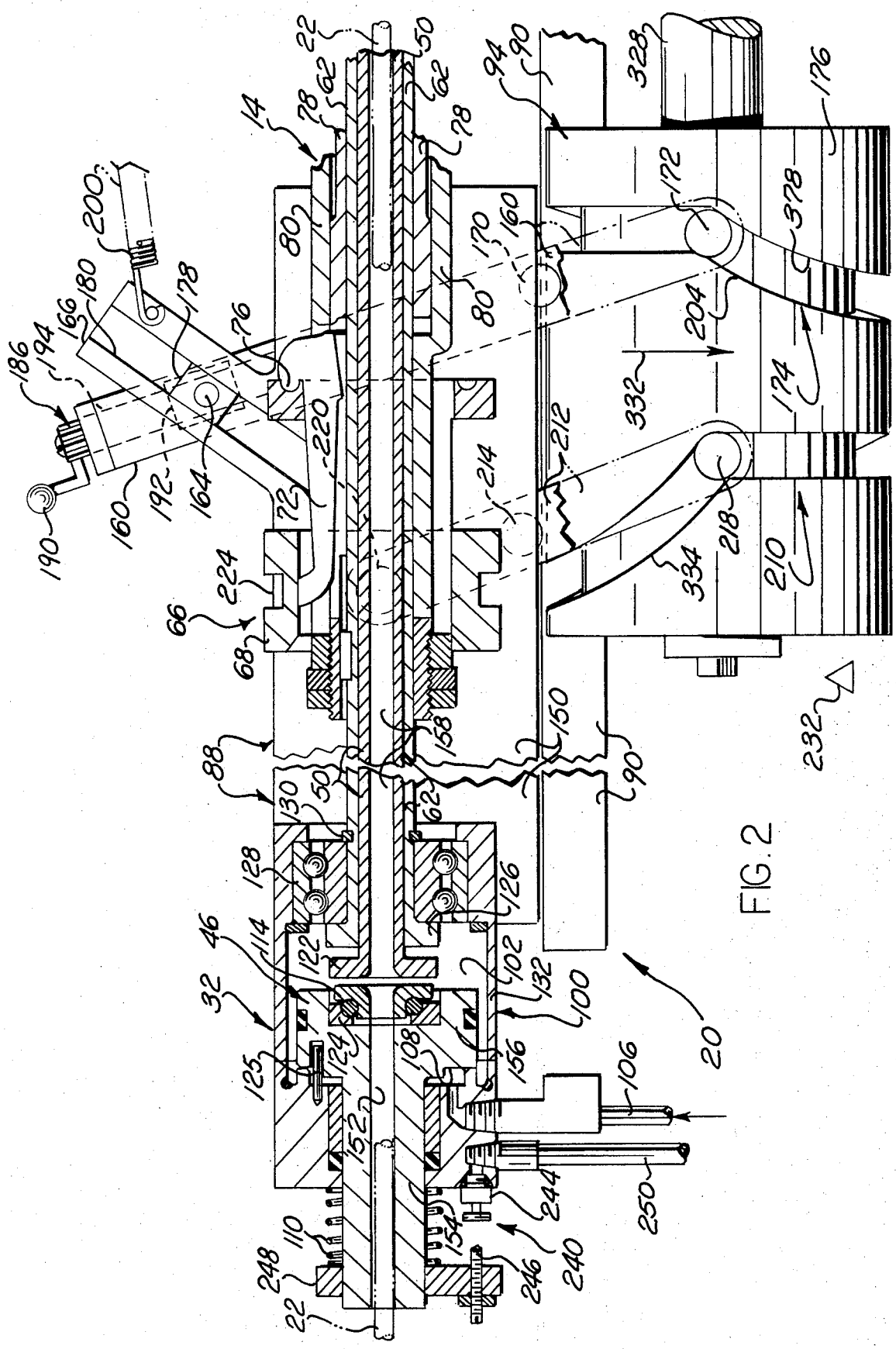
FIG. 2 is a schematic sectional view, taken generally along the line 2—2 of FIG. 1, illustrating a portion of the bar stock feed mechanism in a withdrawn or retracted position prior to initiation of a feed stroke.
Figure 3:
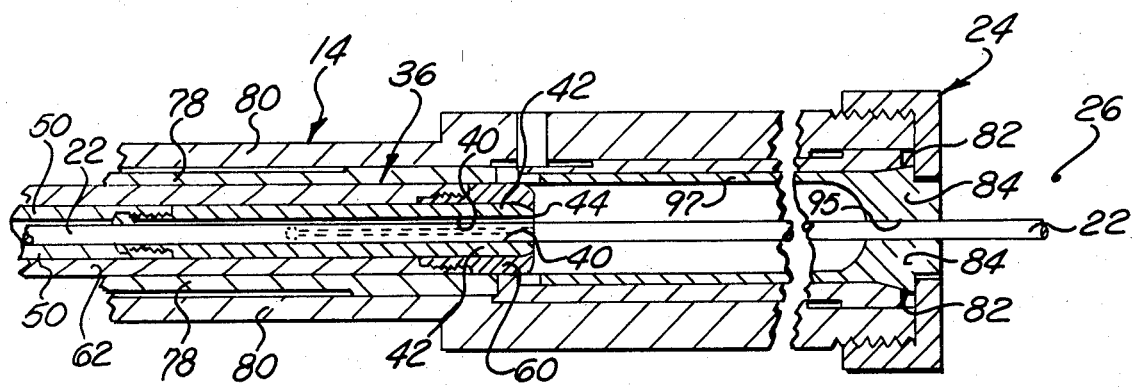
FIG. 3 is a sectional view, taken generally along the line 3—3 of FIG. 1, illustrating the relationship between a spindle chuck and gripper assembly of the bar feed mechanism, the gripper assembly being shown open and in a retracted position prior to initiation of a feed stroke.
Figure 4:
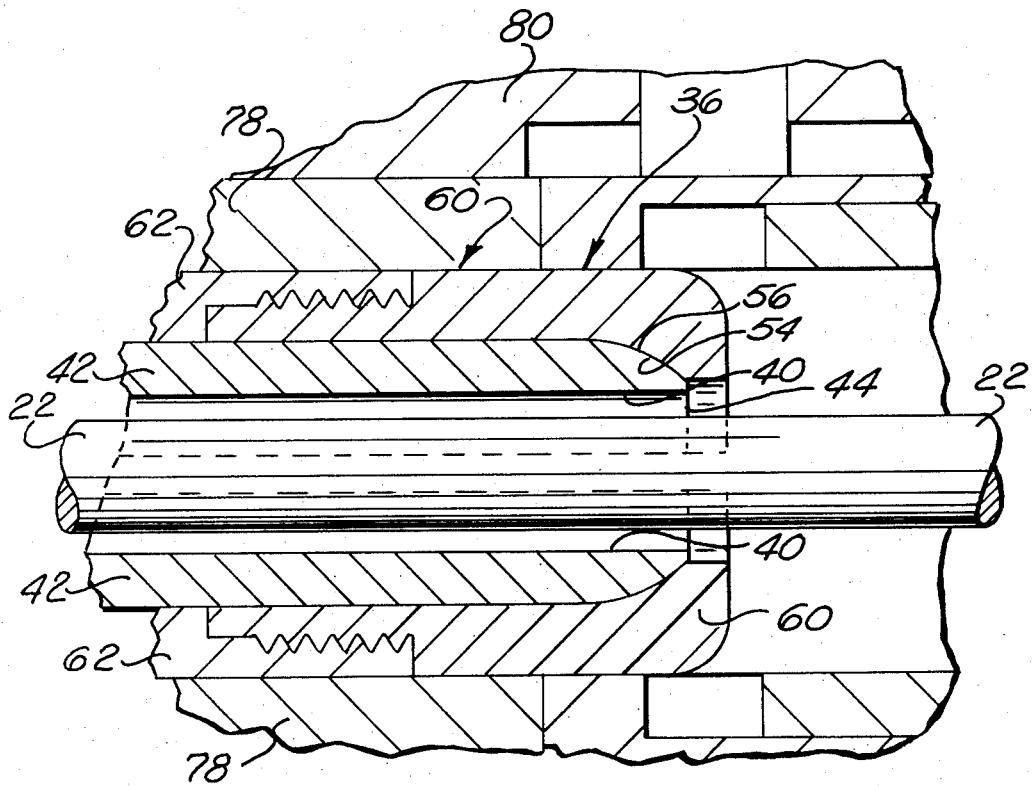
FIG. 4 is an enlarged fragmentary sectional view, further illustrating the relationship between the bar stock and the open gripper assembly of FIG. 3.

At the end of the machining operation and prior to initiation of a bar feed operation, the bar stock feed mechanism 20 is in the retracted or withdrawn position of FIG. 2 so that the gripper assembly 36 is spaced from the spindle chuck 24 (see FIG. 3 which is a continuation of FIG. 2). Immediately prior to the end of the preceeding machining operation, the gripper assembly 36 is operated from the open condition of FIG. 3 to the closed condition of FIG. 6 to securely grip or clamp the bar stock 22 with the collet fingers 42 which are disposed in a circular array around the bar stock. To close the gripper assembly 36, a piston 46 in the gripper actuator assembly 32 presses a cylindrical bar stock actuator tube 50 toward the right (as viewed in FIGS. 2 and 3). This movement of the actuator tube 50 presses inclined surfaces 54 (FIG. 4) on axially outer ends of the collet fingers 42 against an annular cam surface 56 formed on the inside of a nose portion 60 of a cylindrical feed tube 62. As the inclined surfaces 54 on the collet fingers 42 are pressed against the annular cam surface 56, the collet fingers 42 are resiliently deflected inwardly to reduce the size of the opening 44 and to move the surfaces 40 into clamping engagement with the outer surface of the bar stock 22.

Figure 5:
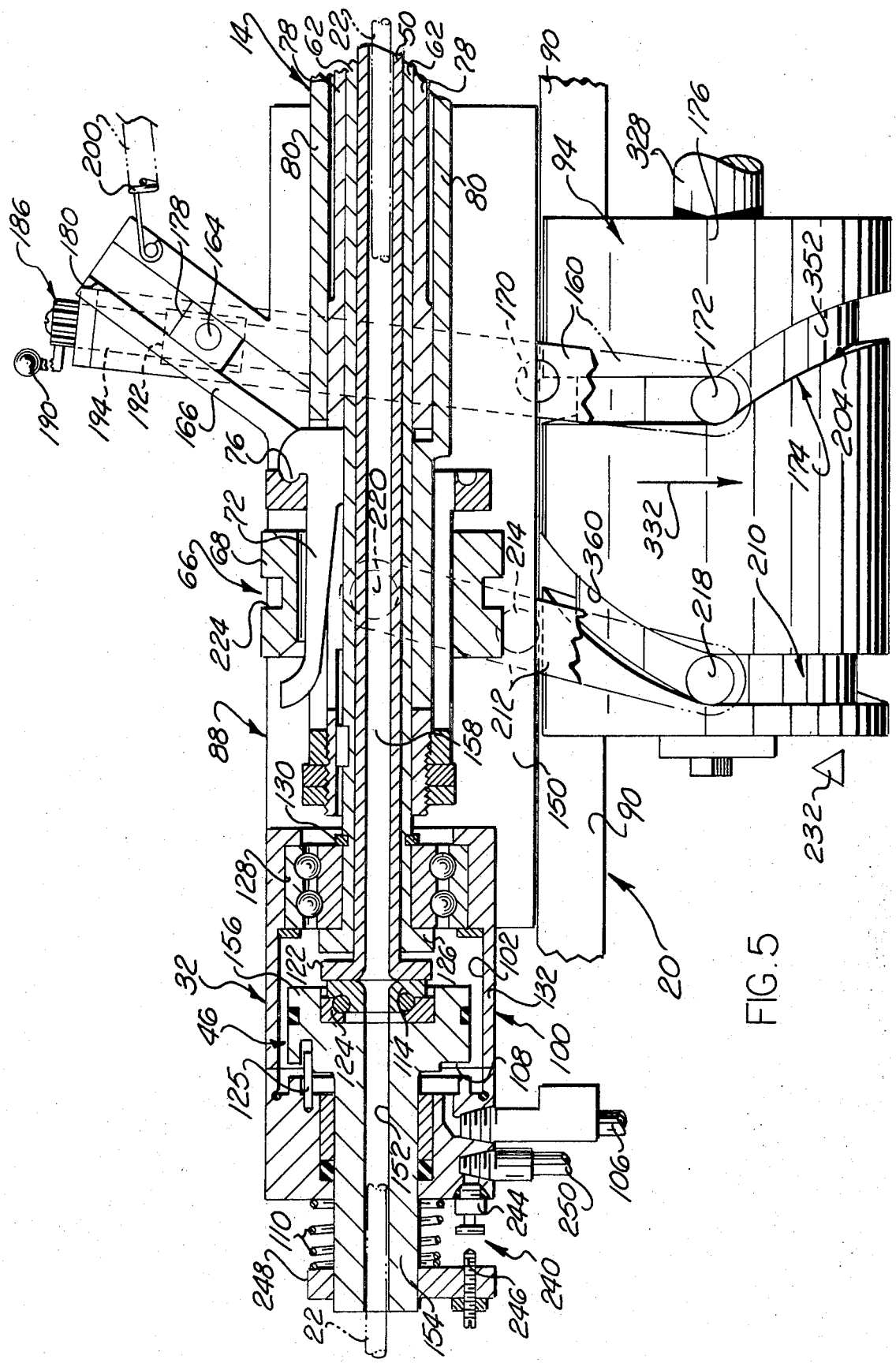
FIG. 5 is a sectional view, generally similar to FIG. 2, illustrating a portion of the bar stock feed mechanism at the end of a feed stroke.
Figure 6:
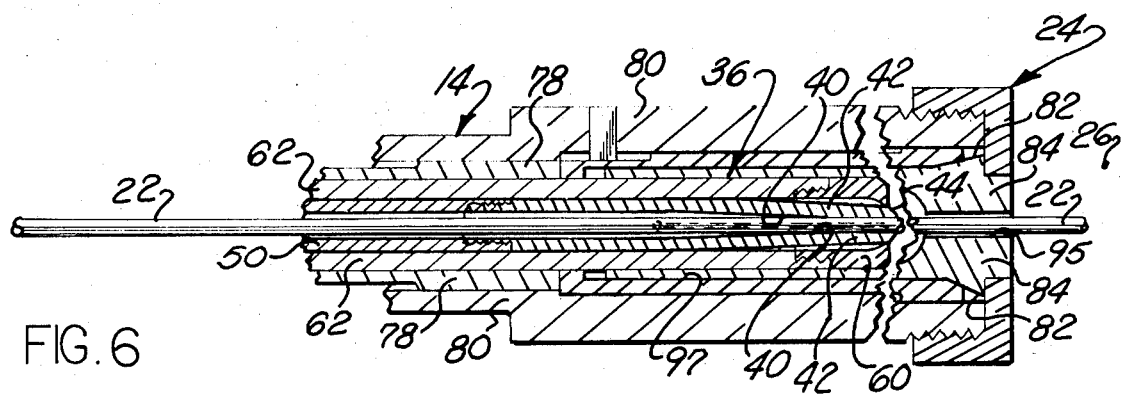
FIG. 6 is a sectional view, generally similar to FIG. 3, illustrating the gripper assembly in a closed condition and in an extended position at the end of a feed stroke.

Once the bar stock 22 has been securely clamped by the gripper assembly 36, the spindle chuck 24 is operated from the closed position of FIG. 3 to the open position of FIG. 6 by a known chuck actuator assembly 66 (see FIGS. 2 and 5). The chuck actuator assembly 66 includes a locking or chucking sleeve 68 which is moved axially toward the chuck 24 to release a plurality of chucking levers 72 (only one of which is shown in FIGS. 2 and 5) for pivotal movement about their nose portions 76. This pivotal movement of the chucking levers 72 releases a chuck actuator tube or sleeve 78 for axial movement relative to a cylindrical spindle tube or housing 80. The released actuator tube 78 is moved axially rearwardly by camming surfaces 82 (FIG. 3) formed on outwardly biased chuck collet fingers 84 as the chuck 24 opens. Thus as the chucking levers 72 pivot in a clockwise direction from the position shown in FIG. 2 to the position shown in FIG. 5, the resilient chuck fingers 84 press the cam surfaces 82 outwardly against the annular outer end portion of the chuck actuator tube 78 to move the chuck actuator tube toward the left from the position shown in FIGS. 2 and 3 to the positions shown in FIGS. 5 and 6. As the resilient chuck fingers 84 move outwardly, the chuck 24 releases the bar stock 22 so that it is held only by the gripper assembly 36.

Once the bar stock 22 has been released by the chuck 24, the bar stock feed mechanism 20 moves the gripper assembly 36 through a feed stroke toward the now open chuck 24 to feed a predetermined length of bar stock into the work area 26. To provide for this movement of the gripper assembly 36, a slide assembly 88 is movable along a track 90 (FIG. 1) on the machine tool base 12 under influence of a cam drive assembly 94. As the slide assembly 88 is moved forwardly, the bar feed tube 62 and actuator tube 50 are moved toward the right from the position shown in FIGS. 2 and 3 to the position shown in FIGS. 5 and 6. Of course, rightward movement of the bar feed tube 62 and actuator tube 50 moves the now closed gripper assembly 36 toward the work area 26 to push bar stock through the open chuck 24.

At the end of a feed stroke, the chuck actuator assembly 66 closes the chuck 24 to clampingly grip the bar stock 22. To effect operation of the chuck 24 to the closed condition, the chucking sleeve 68 is moved axially from the position shown in FIG. 5 to the position shown in FIG. 2 to cam the chucking levers 72 in a counterclockwise direction about their nose portions 76. This counterclockwise movement of the chucking levers 72 forces the chuck actuator tube 78 axially forwardly against the influence of resilient chuck jaws 84. As the chuck actuator tube 78 moves forwardly the chuck jaws 84 are cammed inwardly to securely grip the bar stock 22. It should be noted that at the end of a feed stroke the gripper assembly 36 is closely adjacent to clamping surfaces 95 on the chuck jaws 84 and is disposed inwardly of an axially extending body portion 97 which is integrally formed with the chuck jaws 84. This close proximity between the gripper assembly 36 and chuck jaws 84 at the end of a feed stroke tends to minimize the length of a remnant end portion of the bar stock and scrap material.

After the chuck 24 has been closed, the gripper assembly 36 is opened and moved through a return stroke. Thus once the chuck 24 has clampingly gripped the bar stock 22, the actuator assembly 32 is operated from the activated condition of FIG. 5 to the released condition of FIG. 2. As the actuator assembly 32 moves to the released condition of FIG. 2, the piston 46 moves rearwardly to release the gripper actuator tube 50. The released gripper actuator tube 50 is then moved rearwardly under the influence of a camming action between surface 54 on the resiliently inwardly deflected gripper fingers 42 and the surface 56 on the nose portion 60 of the feed tube 62. Once the gripper fingers 42 reach the open position of FIG. 4, the gripping surfaces 40 on the inside of the gripper fingers are spaced from the outside of the bar stock 22 so that the gripper assembly 36 can be freely moved relative to the bar stock.

When the gripper assembly 36 has been opened, the slide assembly 88 is moved rearwardly under the influence of the cam drive assembly 94. As the slide assembly 88 is moved rearwardly from the position shown in FIG. 5 to the position shown in FIG. 2, the open gripper assembly 36 is moved axially through a return stroke along the bar stock 22 toward the retracted position shown in FIG. 3. Toward the end of the next succeeding machining operation, the gripper assembly 36 is again operated to the closed condition in readiness for the next succeeding feed stroke.

The bar feed actuator assembly 32 effects operation of the gripper assembly 36 between the open and closed conditions. The actuator assembly 32 includes a cylinder assembly 100 (FIG. 2) which defines a cylindrical chamber 102 in which the piston 46 is slidably disposed. (An air cylinder is illustrated, although other actuators such as a hydraulic cylinder or an appropriate electrical actuator and/or mechanical linkage may be employed). When the gripper assembly 36 is to be closed, air under pressure is conducted through a line or conduit 106 to an end face 108 of the piston 46. This results in the piston 46 being moved toward the right (as viewed in FIG. 2) against the influence of a return spring 110. As the piston 46 moves toward the right, a thrust plate 114 is moved into abutting engagement with a flanged rearward end portion 122 of the gripper actuator tube 50. The thrust plate 114 is rotatably supported on the piston 46 by a bearing 124 to enable the gripper actuator tube 50 and thrust plate 114 to rotate with the bar stock 22 and spindle 14 during operation of the machine tool 10. The piston 46 is retained against rotation by a pin 125.

Continued movement of the piston 46 toward the right (as viewed in FIG. 2) presses the flanged end portion of the actuator tube 50 toward an annular flanged end portion 126 of the bar feed tube 62. The bar feed tube 62 is retained against axial movement by a bearing assembly 128 having an inner race which is held between the flanged end portion 126 and a locking ring 130 on the bar feed tube 62. The outer race of the bearing asssembly 128 is connected to an outer wall 132 of the cylinder 100. Since the feed tube 62 cannot move axially relative to the cylinder 100, the piston 46 moves the actuator tube 50 axially forwardly to effect a camming interaction between the gripper fingers 42 and the nose portion 60 of the gripper assembly 36. This camming interaction closes the gripper assembly 36 in the manner previously explained.

The closed gripper assembly 36 is moved through a feed stroke by moving the actuator assembly 32 and slide assembly 88 forwardly from the position shown in FIG. 2 to the position shown in FIG. 5. The slide assembly 88 includes a generally rectangular base section 150 which is moved along the guide track 90 through feed and return strokes by the cam drive 94. The actuator assembly 32 is mounted on the base section 150. When the slide assembly 88 is moved forwardly along the track 90, the piston 46, cylinder assembly 100, closed gripper assembly 36, and bar stock 22 are moved together toward the spindle chuck 24 through a feed stroke. During this feed stroke, the bar stock 22 moves forward through the same distance as the slide assembly 88. Therefore, the distance through which the slide assembly 88 is moved forward determines the length of the bar stock fed to the work area 26. Of course, during a return stroke the gripper assembly 36 is opened and is ineffective to move the bar stock 22 relative to the closed spindle chuck 24.

During the return stroke, the open gripper assembly 36, actuator assembly 32, and slide assembly 88 are all moved rearwardly along the bar stock 22. To provide for this relative movement between the bar stock 22 and actuator assembly 32, a cylindrical passage 152 is formed in a piston rod 154 which extends axially rearwardly from the head 156 of the piston 46. The passage 152 has a larger cross sectional area than the bar stock 22 and forms a continuation of a cylindrical passage 158 extending axially through the actuator tube 50 to the circular opening 44 defined by the gripper assembly 36. During a machining operation, the spindle 14 rotates the bar stock 22 in the passage 152 while the piston 46 is held against rotation.

The cam drive assembly 94 reciprocates the slide assembly 88 to accurately feed the same predetermined length of bar stock through the chuck 24 during each successive bar feed operation. The drive assembly 94 includes drive lever 160 (FIG. 2) which is pivotally connected at 164 to an upstanding arm 166. The arm 166 is integrally formed with the base 150 of the slide assembly 88. The drive lever 160 is pivotally connected at 170 with the base 12 of the machine tool 10. A cam follower 172 on an outer end portion of the drive lever 160 is disposed in engagement with a track 174 in a barrel cam member 176.

Upon rotation of the barrel cam member 176, the cam track 174 causes the drive lever 160 to pivot about the connection 170. This pivotal movement of the drive lever 160 reciprocates the slide assembly 88 between the positions shown in FIGS. 2 and 5. During this reciprocating movement of the slide assembly 88, a slide block 178 moves in and out along a track 180 formed in the upwardly projecting arm 166 to enable the pivot connection 164 to move along an arcuate path.

To enable the length of the feed and return strokes to be varied, a screw type actuator assembly 186 is selectively operable to move the slide block 178 inwardly or outwardly along the track 180. Thus, if a longer feed stroke is desired, a handle 190 is rotated to move a slide block 192 outwardly along a track 194 formed in the lever 160. The slide block 192 is pivotally connected at 164 to the slide block 178 on the arm 166. Therefore, outward movement of the slide block 192 pulls the slide block 178 and pivot connection 164 outwardly to increase the feed stroke through which the slide assembly 88 is moved. Similarly, when the pivot connection 164 is moved inwardly, the feed stroke is decreased. The handle 190 may be actuated to infinitely adjust the feed stroke through a range of adjustment during operation of the machine tool 10 to control part length, for example. If desired, by appropriate addition of trip dogs, modification of camming, or other reprogramming, the same part may be successively fed with cut-off occurring after each set of two or more feed advances. Also, the feed length may be automatically adjusted (as for example by automatic adjustment of the handle 190) to automatically vary the lengths of the feed strokes when the same part is being successively fed.

In accordance with a feature of the present invention, the bar stock feed mechanism 20 is operable to accurately feed a desired length of bar stock to the work area 26 on each feed stroke. To provide for this relatively accurate feeding of bar stock, the cam follower 172 is continuously maintained in pressure engagement with one side or surface of the cam track 174. To this end, a spring 200 is connected to the base 150 of the slide assembly 88 and continuously urges the base toward the right as viewed in FIG. 2. This biasing force urges the drive lever 160 in a clockwise direction about the connection 170. Since the drive lever 160 tends to pivot in a clockwise direction about the pibot connection 170, the cam follower or roller 172 is urged into continuous abutting engagement with the left hand (as viewed in FIG. 2) side or surface 204 of the cam track 174.

Since the roller 172 is continuously urged against one side of the cam track 174 by the action of the spring 200, the extent to which the lever 160 is pivoted about the connection 170 is determined by the shape of the cam track 174. Therefore, the slide 88 is accurately moved through feed and return strokes of the same length on successive revolutions of the drum cam 176. During operation of one specific embodiment of the invention, it was found that bar stock could be consistently fed with an accuracy of ± 0.0015 of an inch. By comparison, for operation of a screw machine having a friction type bar feed mechanism similar to that disclosed in U. S. Pat. No. 2,146,583 and using an accurately positioned stop block, the commonly expected accuracy of positioning of bar stock is only within ± 0.005 of an inch on successive feed cycles. It should be understood that the feed tolerances set forth above are for purposes of illustration only and that the dimensional feed tolerances associated with either bar feed mechanism may vary.

By biasing the cam or roller 172 against one side of the cam track 174, positive movement of the slide assembly 88 through successive feed strokes of a predetermined length is obtained to accurately position a predetermined length of bar stock in the work area 26 without the use of a turret mounted stop block. Elimination of the turret mounted stop block enables all of the mounting positions on the turret 30 (FIG. 1) to be utilized to hold tools 28. Of course, this provides a tool engineer with greater latitude in tool arrangement and design. In addition elimination of the turret mounted stop block eliminates wasted turret indexing time and enables a tool 28 to be advanced toward the cutting position while the bar stock is being fed. During one specific set of operating conditions, the cycle time for a Brown & Sharpe No. 00 Size Automatic Screw Machine was reduced by approximately 25 per cent by the use of a bar feed mechanism constructed in accordance with the present invention. However, it should be understood that the reduction in cycle time set forth above is merely illustrative and that the saving obtained in cycle time by using the bar feed mechanism 20 will vary with the configuration of the piece being machined, tool arrangement and design, and many other factors.

Before a feed stroke is initiated by the bar feed mechanism 20, it is necessary for the spindle chuck 24 to be in the open condition of FIG. 6 with the collet fingers 84 disengaged from the bar stock 22. Similarly, the spindle chuck 24 should be in the closed condition of FIG. 3 before a return stroke is initiated by the bar feed mechanism 20. To positively maintain the desired relationship between the chuck actuator assembly 66 and bar feed mechanism 20, the drum cam 176 is provided with a first track 174 to effect reciprocating movement of the gripper assembly 36 through feed and return strokes and a second track 210 which effects actuation of chuck actuator assembly 66. The chuck actuator assembly 66 includes an actuator lever 212 which is pivotally mounted at 214 on the base 12 of the machine tool 10. A cam follower 218 is provided on one end portion of the actuator lever 212 and engages the cam track 210. A connector roller 220 at the opposite end of the lever 212 engages a circular groove 224 formed in the sleeve 68. Therefore, upon pivoting movement of the actuator lever 212 about the connection 214 due to interaction between the cam track 210 and cam follower 218, the sleeve 68 is moved between the actuated position shown in FIG. 2 in which the chuck 24 is held closed and the released condition of FIG. 5 in which the chuck 24 is open. Since the cam tracks 210 and 174 are formed in the same cam drum member 176, the chuck actuator assembly 66 and drive assembly 94 for the slide 88 are always actuated in the desired sequence relative to each other.

During operation of the machine 10, it is important that a return stroke is not initiated by the bar stock feed assembly 20 until after the spindle chuck 24 has closed to securely grip the bar stock. Thus, only after the slide assembly 88 has been moved forwardly through a feed stroke and the chuck 24 has been closed is the gripper assembly 36 opened and a return stroke initiated. To maintain this predetermined sequential relationship between the closing of the chuck 24, opening of the gripper assembly 36, and initiation of a return stroke, a sensor assembly 230 is associated with the cam 176 (see FIG. 7) and is actuated only after the chuck 24 has closed at the completion of a feed stroke. Actuation of the sensor assembly 230 effects activation of the actuator assembly 32 to open the gripper assembly 36 prior to initiation of a return stroke.

Figure 7:
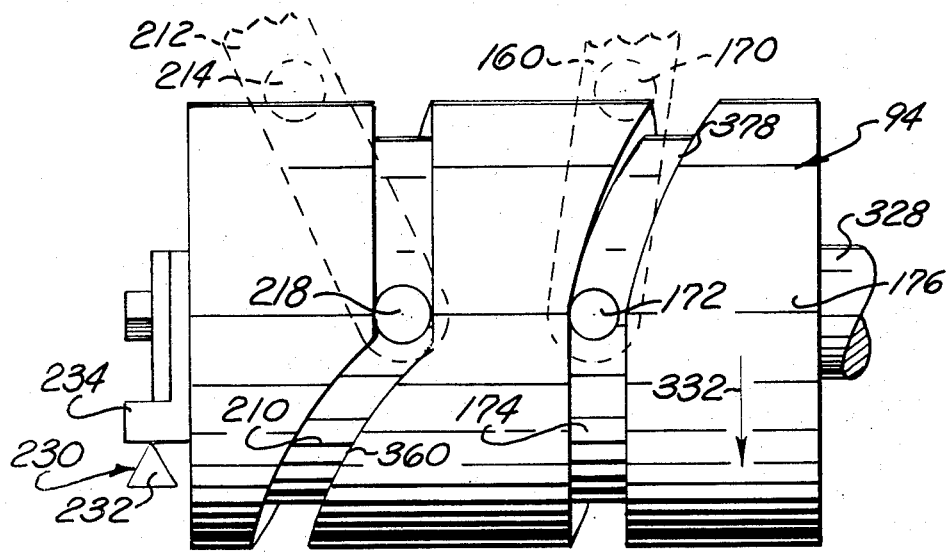
FIG. 7 is an illustration of a cam for controlling operation of the spindle chuck between the open and closed conditions and the movement of the gripper assembly through feed and return strokes.

The sensor assembly 230 includes a valve, indicated schematically at 232 in FIG. 7, which is actuated at the proper time in the feed cycle by a lug 234 connected to the cam 176. Since the lug 234 is disposed in a fixed relationship with the cam tracks 210 and 174, the lug 234 always actuates the valve 232 when the slide assembly 88 has reached the end of a feed stroke and after the chuck 24 has been closed by the actuator assembly 66. This insures that the gripper assembly 36 is opened prior to initiation of a return stroke and after the chuck 24 has closed.

During continued operation of the machine tool 10, it is contemplated that the length of the bar stock 22 may be reduced so that the remnant end portion of the bar stock is shorter than the length of bar stock to be fed to the work area during the next succeeding cycle of operation of the machine tool. When this occurs, the gripper assembly 36 will be moved axially rearwardly of the trailing end of the bar stock 22 during the return stroke of the last feed cycle. Therefore when the actuator assembly 32 is activated to operate the gripper assembly 36 to the closed condition immediately prior to the next succeeding feed cycle, the gripper assembly will not engage the bar stock 22.

When the gripper assembly 36 is closed without bar stock in the gripper assembly, the piston 46 moves through a relatively long forward stroke and moves the annular flanged end portion 122 of the gripper actuator tube 50 into abutting engagement with the flanged end portion 126 of the bar feed tube 62. Due to the absence of bar stock in the gripper assembly 36, there is nothing to prevent the gripper fingers 42 from being pressed inwardly through a relatively large distance toward each other. Of course, this reduces the opening 44 to a size which is smaller than the cross sectional area of the bar stock 22.

When the gripper assembly 36 is operated to the closed condition without a piece of bar stock between the gripper fingers 42, a detector assembly 240 (FIG. 2) is actuated to initiate suitable control functions. The detector assembly 240 includes a sensor valve 244 which is mounted on the cylinder 100 and an actuator member or screw 246 which is mounted on a support member 248 connected to the outer end of the piston rod 154. Upon movement of the piston 46 through a relatively large stroke, which occurs when the gripper assembly 36 is closed in the absence of a piece of bar stock between the gripper fingers 42, the screw 246 opens the valve 244 to exhaust a conduit 250 to atmosphere. The conduit 250 is connected with a relay valve 252 (FIG. 1) which is actuated in response to a reduction in pressure in the conduit 250. Actuation of the relay valve 252 activates a clutch actuator assembly 256 to interrupt or stop operation of the machine tool 10 after completion of machining operations on the portion of bar stock 22 which is located in the work area 26. It is contemplated that the signal from the detector assembly 240 could be utilized to initiate other control functions.

The length of the remnant end portion of the bar stock 22 will be relatively small since the gripper assembly 36 moves into close proximity with the clamping surfaces 95 on the chuck jaws 84. Once the relatively short remnant end portion has been removed from the spindle 14 and a new piece of bar stock has been loaded into the spindle, the machine tool 10 is again set up to resume machining operations.

A control system 300 for the bar stock feed mechanism 20 initiates a bar feed operation upon completion of a machining operation. The control system 300 includes a master control assembly 302 which, in the case of a numerically controlled machine tool, includes a tape reader and known control apparatus for initiating control functions in accordance with a program punched in the tape. However it is contemplated that the master controls 302 could be of a mechanical nature and include suitable trip dogs and control cams such as are shown in the aforementioned text on automatic screw machines published by the Brown and Sharpe Mfg. Co.

Immediately prior to the initiation of a bar feed operation, the actuator assembly 32 is activated to close the gripper assembly 36. Accordingly, while the bar stock 22 is being machined, the master controls 302 activate an actuator assembly 304 to move an actuator rod 306 and open a bleed valve 308 to atmosphere. Opening the bleed valve 308 to atmosphere reduces the pressure in a line 312 to one side of a known three-way pressure operated valve 314. The valve 314 has a spool which is shifted within a housing in response to a change in fluid pressure conducted to either side of the housing. Thus, upon operation of the bleed valve 308 to the open condition, the valve spool is shifted to the right and air under pressure is ported from a supply conduit 318 through the conduit 106 to one end of the piston chamber 102. Conducting high pressure air to the chamber 102 causes the piston 46 to move toward the right (as viewed in FIG. 2) to operate the gripper assembly 36 from the open condition of FIG. 3 to the closed condition of FIG. 6 prior to the initiation of a bar feed operation.

Figure 8:
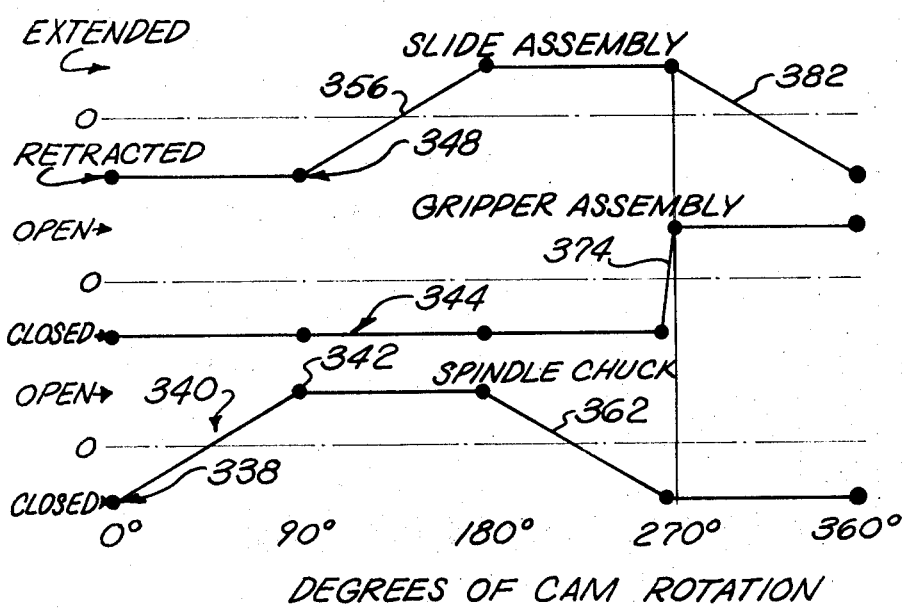
FIG. 8 is a graph depicting the relationship between rotation of the cam of FIG. 7, operation of the bar stock feed mechanism through feed and return strokes, opening and closing of the gripper assembly, and opening and closing of the spindle chuck.

After the gripper assembly 36 has been closed and machining operations on the portion of the bar stock 22 in the work area 26 completed, the drum cam 176 is rotated to initiate a bar feed operation. Thus, upon completion of machining operations the master controls 302 transmit a signal to a clutch actuator assembly 320 (FIG. 1) to effect engagement of a clutch assembly 322. The clutch assembly 322 is connected with a main drive shaft 324 for the machine 10 through a gear box 326 and is drivingly connected with an input shaft 328 to the drum cam 176. Therefore, on engagement of the clutch assembly 322 the drum cam 176 is rotated to actuate the chuck operator assembly 66 from the engaged condition of FIG. 2 to the released condition of FIG. 5 during the first 90° of rotational movement of the drum cam 176 from the position shown in FIG. 2 and in the direction of the arrow 332. As this occurs, a portion 334 of the cam track 210 pivots the actuator lever 212 in a clockwise direction to operate the spindle chuck 24 from the closed condition indicated at 338 on a curve 340 (FIG. 8) to the open condition indicated at 342. During the first 90° of rotation of the drum cam 176, the gripper assembly 36 remains in the closed condition, as shown by a curve 344 in FIG. 8, and the slide assembly 88 remains in the retracted position of FIG. 2, as shown by a curve 348 of FIG. 8.

As the drum cam 176 is rotated from the 90° position to the 180° position, the slide assembly 88 is moved from the retracted position to the extended position to move the gripper assembly 36 through a feed stroke. Thus, a portion 352 of the cam track 174 (FIG. 5) pivots the actuator lever 160 from the position shown in FIG. 2 to the position shown in FIG. 5 during the second 90° of rotation of the cam 176. During this movement of the slide assembly 88 from the extended position to the retracted position, indicated by the portion 356 of the curve 348 (FIG. 8), the gripper assembly 36 remains in the closed position (see curve 344 in FIG. 8) and the spindle chuck 24 remains open (see curve 340).

During somewhat less than the next 90° of rotation the drum cam 176, the spindle chuck 24 is operated to the closed condition. Thus, the portion of the cam track 210 designated 360 in FIG. 5 pivots the actuator lever 212 in a counterclockwise direction to operate the chuck actuator assembly 66 from the released condition of FIG. 5 to the engaged condition of FIG. 2 as the dum cam 176 is rotated through slightly less than 90° from the position shown in FIG. 5. Of course, this operates the spindle chuck 24 from the open condition to the closed condition as indicated by the portion 362 of the curve 340 (see FIG. 8).

When the chuck 24 has closed at the end of the feed stroke, the cam 176 has rotated through slightly less than 270° and is in the position shown in FIG. 7. The valve 232 in the sensor assembly 230 is now opened by the lug 234 to initiate opening of the gripper assembly 36. Operation of the valve 232 ports fluid through a conduit 366 (FIG. 1) to the valve 314 (see FIG. 1) to shift the valve spool and connect the conduit 106 with an exhaust conduit 370. Connecting conduit 106 with the exhaust conduit 370 enables the return spring 110 to move the piston 46 to the left from a position shown in FIG. 5 to the position shown in FIG. 2. Of course, this leftward movement of the piston 46 results in the gripper assembly 36 being operated from the closed condition to the open condition. This operation of the gripper assembly is shown by the portion 374 (FIG. 8) of the curve 344.

During rotation of the drum cam 176 from the 270° position to the 360° position, the portion 378 (FIG. 2) of the cam track 174 pivots the actuator lever 160 to move the slide assembly 88 and gripper 36 through a return stroke. This movement of the slide assembly is indicated by the portion of the curve 348 which is designated 382 in FIG. 8. After rotation of the drive shaft 328 for the drum cam 176 through one complete revolution, the clutch actuator 320 (see FIG. 1) effects operation of the clutch assembly 322 to the disengaged condition to prevent further rotation of the drum cam by the main drive shaft 324.

It is contemplated that during setting up of the machine tool 10 it may be desirable to override the normal mode of operation of the control system 300. Accordingly, a pair of manual override valves 390 and 392 are provided in the lines 366 and 312 to enable the valve 314 to be operated to effect operation of the gripper assembly 36 between the open and closed conditions.

IN view of the foregoing description, it can be seen that the machine tool 10 includes a spindle assembly 14 which rotates the bar stock 22 about its longitudinal axis during operation of the machine tool. The spindle assembly 14 includes a chuck 24 which grips the bar stock during machining operations and retains it against axial movement relative to the spindle assembly.

Upon completion of machining operations on the portion of the bar stock in the work area 26, the chuck 24 is opened and a bar stock feed mechanism 20 is operated to feed a predetermined length of bar stock into the work area. The bar stock feed mechanism 20 includes the gripper 36 which clampingly grips the bar stock 22 during a feed stroke.

Upon completion of a feed stroke, the chuck actuator assembly 66 operates the spindle chuck 24 to the closed condition to grip the bar stock. Once the spindle chuck 24 has closed, the gripper assembly 36 is opened and is retracted from the spindle chuck 24 during a return stroke. When the gripper assembly 36 is in the open condition, gripper surfaces 40 on resilient fingers 42 are spaced from the bar stock 22 to enable the gripper to be moved freely through the return stroke without marring the surface of the bar stock.

A biasing spring 200 urges a cam follower roller 172 into engagement with one side of the cam track 174 so that the bar stock feed mechanism 20 accurately feeds a predetermined length of bar stock to the work area 26 on each feed stroke. Therefore, the cam track 174 acts as a stop surface and it is not necessary to provide a stop block on the turret 30. This enables a tool 28 to be moved to cutting position while the bar stock 22 is being fed into the work area. Since the leading end portion of the bar stock does not hit a stop surface, bar stock having a relatively small cross-sectional area or a pointed end portion may be fed into the work area without being damaged. Of course, elimination of the stop block also realizes the other advantages discussed above.

Although the bar feed mechanism 20 has been illustrated herein in association with a single spindle machine tool, it is contemplated that the feed mechanism could be used with a multiple spindle machine tool. In addition, it is contemplated that the bar stock feed mechanism 20 could be utilized as an attachment for existing machine tools. With certain machine tools it is contemplated that the gripper assembly 36 may be operated between the open and closed conditions by a suitable cam and linkage arrangement rather than with the piston and cylinder type actuator assembly 32.

Having described one specific preferred embodiment of the invention, the following is claimed:

1. An apparatus comprising spindle means for rotating bar stock during a machining operation, said spindle means including a chuck operable between an open condition and a closed condition in which said chuck is effective to grip the bar stock and chuck actuator means for effecting operation of said chuck between the open and closed conditions, feed means for feeding bar stock to said chuck, said feed means including gripper means operable between a closed condition in which said gripper means securely grips the bar stock and an open condition in which said gripper means is ineffective to grip the bar stock, gripper actuator means for effecting operation of said gripper means between the open and closed conditions when said chuck is in the closed condition, and means for moving said gripper means through a feed stroke toward said chuck with said gripper means in its closed condition and said chuck in its open condition and for moving said gripper means through a return stroke away from said chuck with said gripper means in its open condition and said chuck in its closed condition, said gripper actuator means including a piston and cylinder assembly connected with said gripper means and control means for activating said piston and cylinder assembly to effect operation of said gripper means between its open and closed conditions, said piston and cylinder assembly including a piston and cylinder which are movable relative to each other through a first operating stroke upon activation of said piston and cylinder assembly to effect operation of said gripper means from its open condition when a piece of bar stock is disposed within said gripper means, said piston and cylinder being movable relative to each other through a second operating stroke which is larger than said first operating stroke upon activation of said piston and cylinder assembly to effect operation of said gripper means from its open condition without a piece of bar stock disposed within said gripper means.

2. An apparatus as set forth in claim 1 further including means for detecting movement of said piston and cylinder relative to each other through said second operating stroke and for initiating a control function in response to the detection of movement of said piston and cylinder relative to each other through said second operating stroke.

3. An apparatus comprising spindle means for rotating bar stock during a machining operation, said spindle means including a chuck operable between an open condition and a closed condition in which said chuck is effective to grip the bar stock and chuck actuator means for effecting operation of said chuck between the open and closed conditions, feed means for feeding bar stock to said chuck, said feed means including gripper means operable between a closed condition in which said gripper means securely grips the bar stock and an open condition in which said gripper means is ineffective to grip the bar stock, gripper actuator means for effecting operation of said gripper means between the open and closed conditions when said chuck is in the closed condition, and means for moving said gripper means through a feed stroke toward said chuck with said gripper means in its closed condition and said chuck in its open condition and for moving said gripper means through a return stroke away from said chuck with said gripper means in its open condition and said chuck in its closed condition, said gripper actuator means including a piston and cylinder assembly connected with said gripper means and control means for activating said piston and cylinder assembly to effect operation of said gripper means between its open and closed conditions, said actuator means further including means for mounting said piston and cylinder assembly in a coaxial relationship with the axis about which said spindle means rotates bar stock during a machining operation, said piston and cylinder assembly including means for at least partially defining a passage through which the bar stock extends when it is being rotated by said spindle means.

4. An apparatus comprising spindle means for rotating bar stock during a machining operation, said spindle means including a chuck operable between an open condition and a closed condition in which said chuck is effective to grip the bar stock and chuck actuator means for effecting operation of said chuck between the open and closed conditions, feed means for feeding bar stock to said chuck, said feed means including gripper means operable between a closed condition in which said gripper means securely grips the bar stock and an open condition in which said gripper means is ineffective to grip the bar stock, gripper actuator means for effecting operation of said gripper means between the open and closed conditions when said chuck is in the closed condition, and means for moving said gripper means through a feed stroke toward said chuck with said gripper means in its closed condition and said chuck in its open condition and for moving said gripper means through a return stroke away from said chuck with said gripper means in its open condition and said chuck in its closed condition, said means for moving said gripper means through feed and return strokes including a drive element which is connected with said gripper means and which is movable in a first direction to effect movement of said gripper means through a feed stroke and is movable in a second direction to effect movement of said gripper means through a return stroke, first limit surface means for limiting motion of said drive element in the first direction, second limit surface means for limiting motion of said drive element in the second direction, and means for pressing said drive element against said first limit surface means at the end of a feed stroke and for pressing said drive element against said second limit surface means at the end of a return stroke to thereby effect movement of said gripper means through feed and return strokes of a predetermined length, said first and second limit surface means forming portions of a cam surface, said drive element including a cam follower, and said means for pressing said drive element against said first and second limit surface means including spring means for urging said cam follower into abutting engagement with said cam surface.

5. An apparatus comprising spindle means for rotating bar stock during a machining operation, said spindle means including a chuck operable between an open condition and a closed condition in which said chuck is effective to grip the bar stock and chuck actuator means for effecting operation of said chuck between the open and closed conditions, feed means for feeding bar stock to said chuck, said feed means including gripper means operable between a closed condition in which said gripper means securely grips the bar stock and an open condition in which said gripper means is ineffective to grip the bar stock, gripper actuator means for effecting operation of said gripper means between the open and closed conditions when said chuck is in the closed condition, and means for moving said gripper means through a feed stroke toward said chuck with said gripper means in its closed condition and said chuck in its open condition and for moving said gripper means through a return stroke away from said chuck with said gripper means in its open condition and said chuck in its closed condition, said gripper means including surface means defining an opening through which the bar stock passes, said gripper actuator means being operable to vary the size of said opening from a first cross sectional area to a second cross sectional area which is smaller than said first cross sectional area upon operation of said gripper means from the open condition to the closed condition with a piece of bar stock extending through said opening, said gripper actuator means being operable to vary the size of said opening from said first cross sectional area to a third cross sectional area which is smaller than said second cross sectional area upon operation of said gripper means from the open condition to the closed condition without a piece of bar stock extending through said opening, said apparatus further including detector means for detecting a reduction in the size of said opening from said first cross sectional area to said third cross sectional area to thereby detect operation of said gripper means from the open condition to the closed condition without a piece of bar stock in said gripper means.

6. In a machine tool, apparatus for longitudinally feeding bar stock to a work area and chucking the bar stock adjacent the work area comprising chuck means next to the work area, chuck operating means, stock feed means including gripper means engageable in non-slip engagement with the stock during initiation, execution and termination of each stock advance, said gripper means being shiftable back and forth along the feed direction between a retracted position relatively spaced from the chuck means to an advanced position adjacent the chuck means, gripper operating and shifting means extending longitudinally along the feed direction to the gripper means and located transversely interiorly of the chuck operating means, means for controlling said chuck operating means and said gripper operating and shifting means for causing either said chuck means or said gripper means or both continuously to grip the bar stock during the feeding and machining of a length of bar stock, the forward work-engaging extremity of the gripper being within a portion of the chuck means that is integral with the work-engaging portion of the chuck means when the gripper is in advanced position.

* * * * *